United States Patent
Childress et al.

(10) Patent No.: US 8,019,845 B2
(45) Date of Patent: Sep. 13, 2011

(54) SERVICE DELIVERY USING PROFILE BASED MANAGEMENT

(75) Inventors: Rhonda L. Childress, Austin, TX (US); Itzhack Goldberg, Hadera (IL); Lorraine M. Herger, Port Chester, NY (US); Ziv Rafalovich, Yokneam Illit (IL); Ramakrishnan Rajamony, Austin, TX (US); Eric Van Hensbergen, Austin, TX (US); Martin J. Tross, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/422,225

(22) Filed: Jun. 5, 2006

(65) Prior Publication Data

US 2007/0282985 A1    Dec. 6, 2007

(51) Int. Cl.
*G06F 15/16* (2006.01)

(52) U.S. Cl. ........ 709/223; 709/218; 709/221; 709/224; 726/2; 726/6

(58) Field of Classification Search .................. 709/244, 709/218, 224, 223, 221, 233; 717/171; 726/2, 726/6

See application file for complete search history.

(56) References Cited

U.S. PATENT DOCUMENTS

| | | | |
|---|---|---|---|
| 5,797,128 A | 8/1998 | Birnbaum | |
| 5,809,492 A | 9/1998 | Murray et al. | |
| 5,889,953 A | 3/1999 | Thebaut et al. | |
| 5,907,844 A | 5/1999 | Guay et al. | |
| 6,327,618 B1 | 12/2001 | Ahlstrom et al. | |
| 6,381,639 B1 | 4/2002 | Thebaut et al. | |
| 6,466,932 B1 | 10/2002 | Dennis et al. | |
| 6,484,261 B1 | 11/2002 | Wiegel | |
| 6,556,985 B1 | 4/2003 | Karch | |
| 6,785,728 B1 | 8/2004 | Schneider et al. | |
| 6,826,698 B1 | 11/2004 | Minkin et al. | |
| 6,880,005 B1 | 4/2005 | Bell et al. | |
| 6,950,825 B2 | 9/2005 | Chang et al. | |
| 7,013,332 B2 | 3/2006 | Friedel et al. | |
| 7,065,745 B2 | 6/2006 | Chan | |
| 7,171,659 B2 * | 1/2007 | Becker et al. | 717/171 |
| 7,203,744 B1 | 4/2007 | Parekh et al. | |
| 7,350,226 B2 | 3/2008 | Moriconi et al. | |
| 7,461,395 B2 | 12/2008 | Ng | |
| 7,519,600 B1 * | 4/2009 | Zenz | 707/10 |
| 7,584,467 B2 * | 9/2009 | Wickham et al. | 717/171 |
| 2002/0016840 A1 | 2/2002 | Herzog et al. | |
| 2002/0069200 A1 | 6/2002 | Cooper et al. | |

(Continued)

OTHER PUBLICATIONS

U.S. Appl. No. 11/422,239, Childress et al.

(Continued)

*Primary Examiner* — Djenane M Bayard
(74) *Attorney, Agent, or Firm* — Yee & Associates, P.C.; Libby Z. Toub

(57) ABSTRACT

A computer implemented method, data processing system, and computer program product for automatically aggregating entities via a profile-driven management. A profile is created, wherein the profile includes a set of search criteria comprising one or more server attributes. A list of attributes of each server in the data processing system is obtained. Servers in the plurality of servers whose attributes meet the set of search criteria specified in the profile are then grouped to form a profile group. Once the servers are grouped into a profile, an administrative action may be performed on all of the servers in the profile group simultaneously.

18 Claims, 5 Drawing Sheets

U.S. PATENT DOCUMENTS

| | | | |
|---|---|---|---|
| 2002/0091815 A1* | 7/2002 | Anderson et al. | 709/223 |
| 2003/0037040 A1 | 2/2003 | Beadles et al. | |
| 2003/0069736 A1 | 4/2003 | Koubenski et al. | |
| 2003/0069737 A1 | 4/2003 | Koubenski et al. | |
| 2003/0115292 A1 | 6/2003 | Griffin et al. | |
| 2004/0103211 A1 | 5/2004 | Jackson et al. | |
| 2004/0117765 A1 | 6/2004 | Chan | |
| 2004/0177139 A1 | 9/2004 | Schuba et al. | |
| 2005/0160411 A1 | 7/2005 | Sangal et al. | |
| 2005/0289388 A1* | 12/2005 | Black-Ziegelbein et al. | 714/7 |
| 2005/0289401 A1* | 12/2005 | Goin et al. | 714/47 |
| 2006/0010449 A1* | 1/2006 | Flower et al. | 718/102 |
| 2006/0225123 A1 | 10/2006 | Childress et al. | |
| 2006/0259604 A1* | 11/2006 | Kotchavi et al. | 709/223 |
| 2007/0133759 A1 | 6/2007 | Malik et al. | |
| 2007/0282986 A1 | 12/2007 | Childress et al. | |
| 2008/0028029 A1 | 1/2008 | Hart | |
| 2008/0140835 A1* | 6/2008 | Bradley et al. | 709/225 |

OTHER PUBLICATIONS

"ManageSite SE 1.1 for Blade Server" Amphus, Inc., 2002, pp. 1-2.

"ManageSite SE 1.1 for Blade Server", Amphus.

USPTO Office Action for U.S. Appl. No. 11/422,239 dated Oct. 30, 2008.

USPTO Office Action for U.S. Appl. No. 11/422,239 dated Apr. 29, 2009.

* cited by examiner

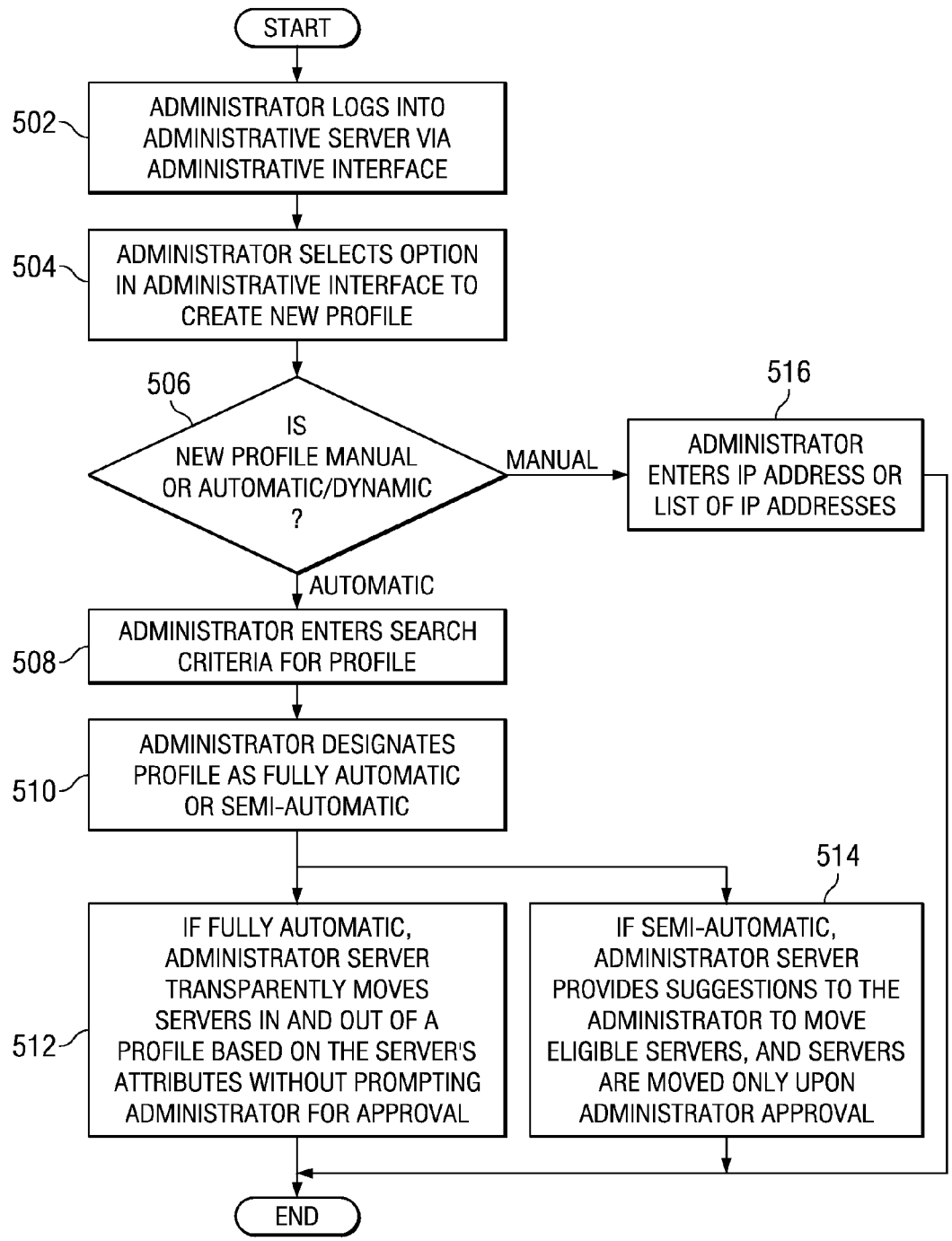

SERVICE DELIVERY USING PROFILE BASED MANAGEMENT

BACKGROUND OF THE INVENTION

1. Field of the Invention

The present invention relates generally to an improved data processing system, and in particular, to a computer implemented method, data processing system, and computer program product for aggregating entities in a service delivery center environment for management via profiles.

2. Description of the Related Art

A service delivery center (SDC) is a work center that is responsible for the ongoing maintenance of network computing elements. Examples of service delivery centers include the International Business Machines™ Strategic Outsourcing Delivery Centers, which are service centers that provide technology services and solutions to customers in support of the customers' business strategies. A typical service delivery center may comprise thousands of servers, each of which has an identity in terms of hardware, operating systems, applications, etc. The identity of each server must be maintained and serviced for many different customers.

In current service delivery systems, an administrator may perform administrative actions on servers in the network. These administrative actions may be performed on a set of servers. To apply an action to a set of servers, the administrator creates a static server group, wherein servers may be added to the group. However, when the administrator adds or removes servers from a static server group, the administrator must manually add or remove each individual server on a machine-by-machine basis from the group. Such a serial process of adding or removing servers can be a significant time waste for the administrator, and the administrator has no reasonable way to improve productivity.

Therefore, it would be advantageous to have a mechanism that allows machines to be automatically grouped together and treated as one logical entity, such that a single administrative action by an administrator may be applied to multiple machines simultaneously.

SUMMARY OF THE INVENTION

The illustrative embodiments described herein provide a computer implemented method, data processing system, and computer program product for automatically aggregating entities via a profile-driven management. A profile is created, wherein the profile includes a set of search criteria comprising one or more server attributes. A list of attributes of each server in the data processing system is obtained. Servers in the plurality of servers whose attributes meet the set of search criteria specified in the profile are then grouped to form a profile group. Once the servers are grouped into a profile, an administrative action may be performed on all of the servers in the profile group simultaneously.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for creating a profile in accordance with the illustrative embodiments;

DETAILED DESCRIPTION OF THE PREFERRED EMBODIMENT

Figure 1:
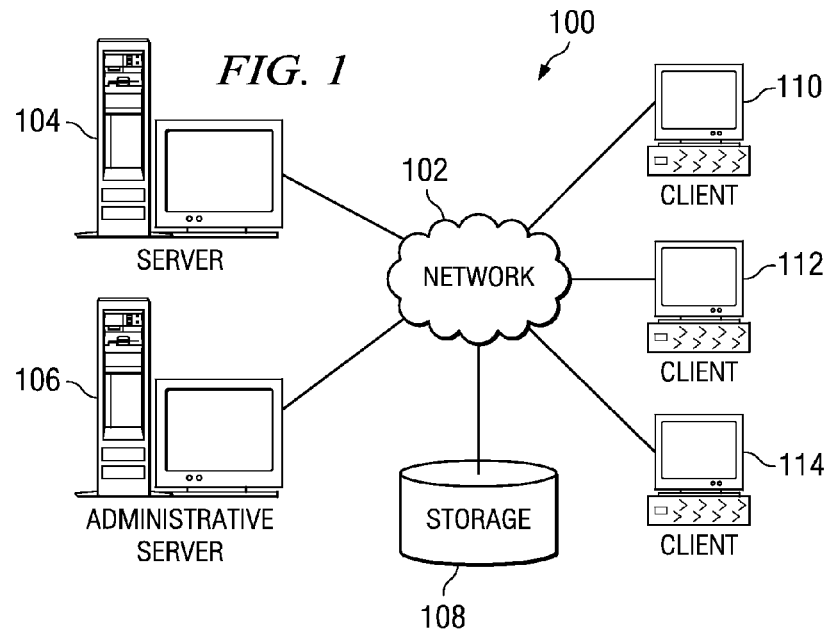
FIG. 1 depicts a pictorial representation of a distributed data processing system in which the illustrative embodiments may be implemented.
Figure 2:
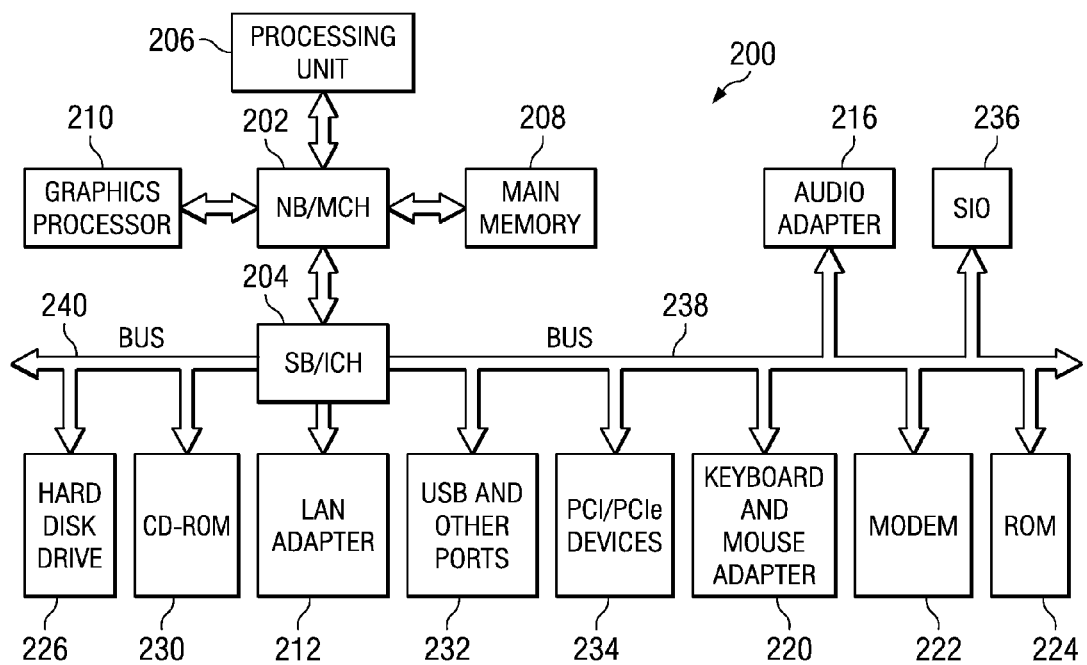
FIG. 2 is an exemplary block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this illustrative example, server 106 is an administrative server which may be used to manage, upgrade, and service machines in the network data processing system. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a profile-driven management system that allows for automatically aggregating entities into groups using profiles. A profile comprises configuration settings and other data which represent distinctive features or characteristics of a group. An entity may be a physical or logical server, storage controller, or the like. Based on characteristics in a profile, machines having specific attributes matching the profile may be grouped together to form an entity group. As a result, an administrator may manage profiles, rather than managing the individual machines themselves. An administrator may include any administrators of computerized systems, such as system administrators, database administrators, web server administrators, and the like. Grouping entities together and treating them as one logical entity also allows for minimizing costs and increasing the number of entities a single full-time equivalent (FTE) can manage, since the FTE may use a single action to affect multiple entities simultaneously. Furthermore, grouping entities via profiles allows one to efficiently manage, upgrade, and service the entities, thereby contributing to system productivity.

In contrast with existing systems which require an administrator to manually nominate specific servers (e.g., by name, IP address) to be included in a static server group, with the illustrative embodiments, the administrator may specify a set of profile search criteria which allows servers to be automatically added to or removed from a server group based on attributes of the servers. The profile search criteria specifies which servers in an enterprise may be grouped together to perform a particular system administration task based on the attributes of the servers. Profile search criteria may be defined using server selection criteria (Just a Bunch Of Servers (JBOS), or attribute-based profile (ABP) criteria. JBOS search criteria allows searching for particular servers listed in the profile by hostname, serial number, or network address. ABP search criteria allows for searching attributes specified in the list of the attributes in the profile. For instance, the ABP search may comprise static criteria or dynamic criteria. Static criteria include information on the server that remains constant for a long period of time. Examples of static criteria include, but are not limited to, "Linux® OS" or "Has JVM™ version X". Dynamic criteria include information on the server that frequently changes. Examples of dynamic criteria include, but is not limited to, Internet Protocol (IP) Address, load average, number of users currently logged in.

Attributes of a server may be hardware, software, or existential attributes, and may include business context, physical attributes, defined behavior, and health parameters. Attributes of a particular server may be obtained in various ways, including by allowing a server to advertise its attributes, such as within a publish-subscribe model, by allowing a management server to scan the server to determine its attributes, or by allowing an administrator to tag the server with existential attributes. Once a server's attributes are known, if the server's attributes match one or more defined profiles, the server is eligible to be grouped into the one or more profile groups.

In the profile-driven management system, the addition or removal of a server from a profile group may be performed automatically or semi-automatically. A profile group change is performed automatically when, upon a determination that a server now falls within or outside of a profile group, the administrative server transparently and seamlessly adds or removes the server profile group in an automated fashion. In most cases, however, it is preferable that changes to a profile group occur upon approval by the administrator to provide greater control over when and if a server may fall in and out of a profile group. A profile group change is performed semi-automatically by allowing the administrative server to make suggestions to the administrator by providing possible server candidates for adding to or changing groups. The profile search criteria are persistent, such that if changes are made to the servers overnight, the administrator will be notified of any changes meeting the profile search criteria when the administrator logs in the next morning. The administrator will be informed which machines are eligible to enter the profile and which machines may now leave the profile. The administrator is then prompted to approve or disapprove the suggested action. Thus, while the administrative server suggests changes to the profile groups, the changes are made only upon approval by the administrator.

Figure 3:
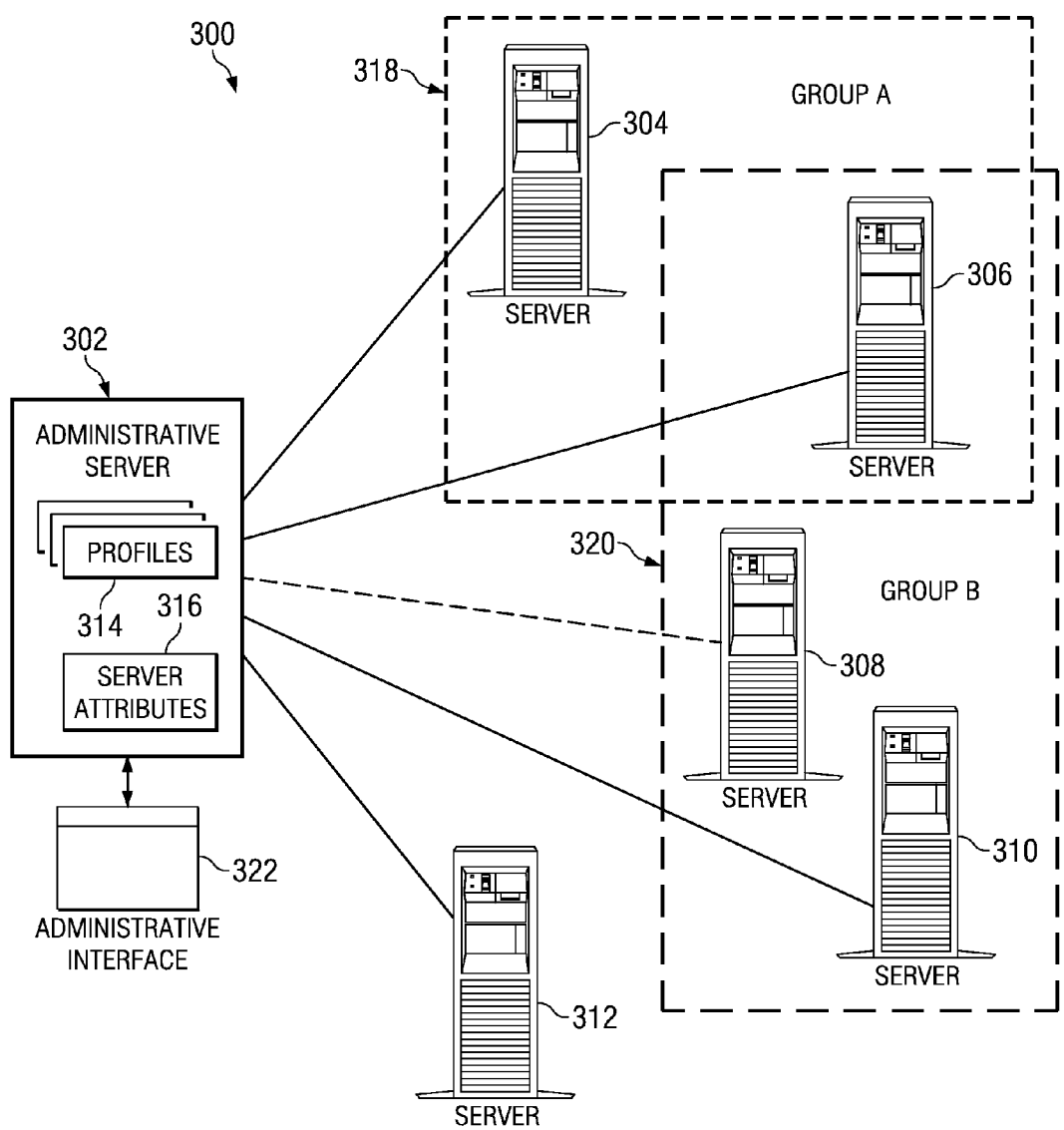
FIG. 3 is an exemplary block diagram comprising components used for managing server membership in groups in accordance with the illustrative embodiments.

Turning now to FIG. 3, an exemplary block diagram comprising components used for managing server membership in groups in accordance with the illustrative embodiments is shown. In this illustrative example, data processing system 300 comprises administrative server 302 and a plurality of servers (server 304, server 306, server 308, server 310, and server 312). Administrative server 302 houses an administrative application for performing remote management actions on servers 304-312.

Administrative server 302 also comprises profiles 314 and server attribute information 316. Profiles 314 include data managed on the administrative server which represents characteristics of the server groups. Server attribute information 316 includes any searchable information about a server, including hardware, software, or existential attributes. These attributes may include business context, physical attributes, defined behavior, and health parameters. Administrative server 302 uses search criteria specified in profiles 314 and server attribute information 316 to determine which of servers 304-312 may be grouped together. For instance, in this illustrative example, servers 304 and 306 have been grouped together to form profile group A 318, and servers 306, 308, and 310 have been grouped together to form profile group B 320. As shown, a server, such as server 306, may belong to one or more profile groups. Servers may also not be a member of any profile group, such as server 312. Thus, if the attributes of a server do not meet the search criteria in a profile, the server is not included in the profile group.

A benefit of aggregating servers in to groups is that administrative actions may be performed based on server membership in a profile. Thus, rather than having to perform an action multiple times with respect to multiple individual servers, a single administrative action by an administrator may be applied to multiple machines within a profile group simultaneously. Every administrative action, such as any change, patch, or configuration, should be performed on a profile, rather than performing the action directly on an individual server. As changes are made to attributes of a server, the administrative server may automatically move the server into, out of, or between profiles. For example, if changes occur to an existing server or a new server is added to the system, the server may automatically be included in or removed from one or more profiles based on the attributes of the server. Another benefit of aggregating servers into groups is that an administrator may also generate system reports based on the profiles. The profiles may also be associated with policies and policy variables. A policy is a collection of rules. The rules specify specific actions to be performed on servers or by servers. The profiles my also be associated with constraints. Constraints govern the execution of rules and may include pre-conditions such as machine load average or the number of users logged in. Temporal constraints (schedules) may be used to enforce rule execution within a designated change-window, or may be used to specify time ranges when services cannot be disrupted.

The administrator may create and define profiles, enter search criteria, and approve/disapprove server additions/removals within the profiles via administrative interface 322. The illustrative embodiments are not limited to a specific interface embodiment; rather, any interface that allows for managing profiles and server attributes and specifying profile search criteria may be used. When the administrator creates a profile by setting up attribute search criteria via the administrative interface, the administrator may also set the profile membership to be fully automated or semi-automated. For example, if the profile membership is fully automated, when administrative server 302 determines from the search criteria and server attribute information that a server should be added to a profile group, the administrative server may automatically assign the server to the group. If the profile membership is semi-automated, rather than automatically assigning the server to the profile group, the administrative server makes a suggestion to the administrator that the server is a candidate for addition to the group. The administrative server then waits for the administrator to approve the change before assigning the server into the group. Profiles may also be automatically created based on the results of actions performed on the servers. Consider the example of a server performing an action such as running a security scan. Some servers may pass the security scan, and some servers may fail the security scan. Upon completion of the scan, these new pass/fail attributes may be used to automatically create a profile. For instance, two profiles may be created—one profile that groups together servers that passed the scan, and another profile for those servers that failed the scan.

As previously mentioned, administrative server 302 uses server attribute information 316 to determine whether a server should be added to and/or removed from a profile. Server attribute information 316 may be provided to or obtained by the administrative server in various ways. In one example, server attribute information 316 may be provided to the administrative server using a publish-subscribe model. In this situation, the server initiates the action by pushing its attribute information outward, either by posting the attribute information to the administrative server, or by multicasting the attribute information, whereby anyone listening on the multicast channel may obtain the attribute information. In another example, the administrative server initiates the action by requesting that a server provide its attribute information to the administrative server, either by running a script on the server, or by accessing an administrative interface on the server (e.g., via Simple Network Management Protocol (SNMP)) and retrieving the attribute information. In a third example, the administrator may tag the server by assigning attributes to the server. These administrator-tagged attributes typically are existential, meaning that these attributes are not necessarily attributes that can be derived from the server itself. For example, the administrator may assign an attribute to a server that specifies that the server "is used for customer X". Thus, existential attributes comprises information of which the server itself may not be aware, and there's no way for the server to query and obtain this information. It should be noted that these methods for providing the server attribute information to the administrative server may be performed periodically to ensure that the attribute information maintained at the administrative server is up-to-date.

Figure 4:
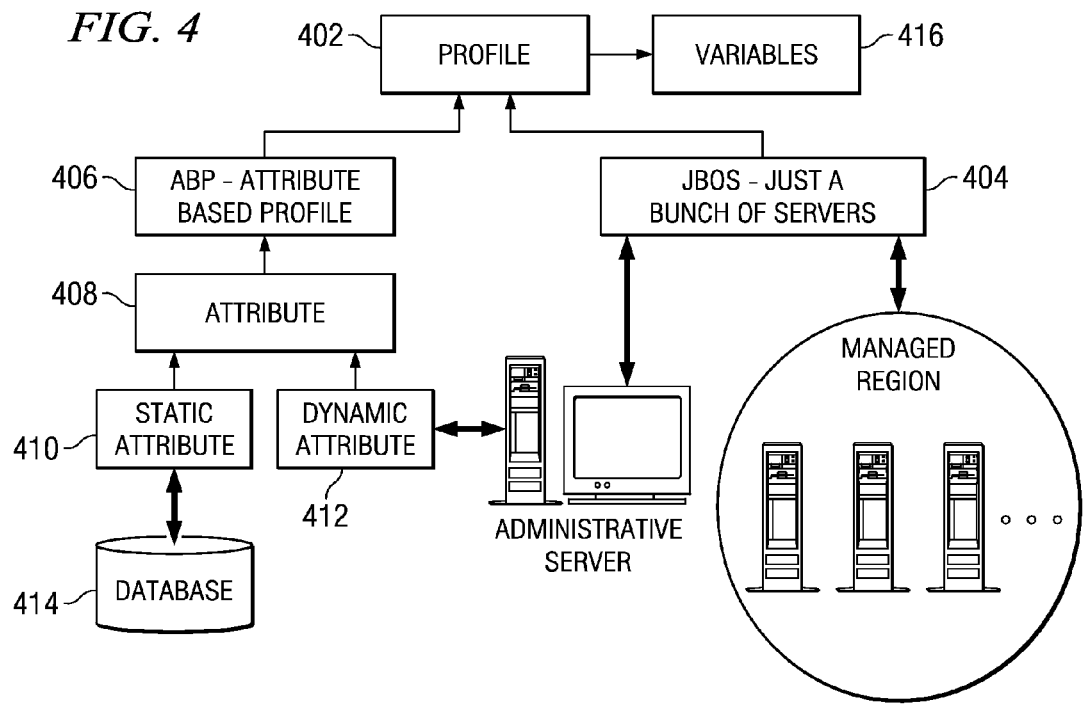
FIG. 4 is an exemplary block diagram illustrating search criteria elements of a profile in accordance with the illustrative embodiments.

FIG. 4 is an exemplary block diagram illustrating search criteria elements of a profile in accordance with the illustrative embodiments. Each profile, such as profile 402, is defined by a unique name to identify the profile, and a description of the profile specifying the purpose of the profile. A profile is also defined as global or local. A profile is local if a single administrator creates and maintains the profile. A profile is global if the profile may be used across administrator accounts, such that a group of users "own" the profile. Thus, a global profile may have different ownership models, different processes for approval, validation, verification, distribution, and the like, than those used in a local profile.

In this illustrative example, search criteria created for profile 302 may be server selection-based (Just a Bunch Of Servers (JBOS)) 404 or attribute-based (attribute-based profile (ABP) 406. When server selection-based, the search criteria are used to search for particular servers listed in the profile. JBOS profiles are equivalent to the existing state-of-the-art, where administrators manually add individual machines to groups. When attribute-based, the search criteria are used to search server attributes 408 specified in the profile. Server attributes 408 may be static attributes 410 or dynamic attributes 412. A static attribute is a server attribute that remains constant for a long period of time. A profile based on static attributes includes attributes which define the role and behavior of the server, and may be defined in database 414. Such roles and behaviors include geographic location, account, and requested service level agreement (SLA). Static attributes 410 comprise the attribute name, value, and may also contain information regarding the source of the attribute data, version information, when the attribute was last updated, and who last updated the attribute (in the case of existential attributes). Static attributes may also contain a default attribute which provides a reset-value default.

A dynamic attribute is a server attribute that frequently changes. A profile based on dynamic attributes includes attributes which are validated at the server, such as, for example, the operating system type, kernel version, existence of a file, or result of a script. Dynamic attribute 412 may comprise the attribute type, including the existence of a running program, directory, or file on the managed server, and the output from running a program on that server. Dynamic attributes also contain a default-value which is used on reset or any other time when dynamic information can not be obtained.

Profile variables 416 comprise a list of variables (and values) which can be used to customize specific instances of a profile. For instance, if a dynamic profile is instantiated to match all systems with a load average under a certain level, a threshold for the "certain-level" may be set to a variable, thereby allowing the same dynamic profile to be reused in multiple scenarios where different thresholds are desired.

Profile 402 shown in this illustrative example may be a profile in a hierarchy of profiles. A collection of servers may be automatically grouped into a hierarchy of profiles with all servers being members of the root profile, and each of the servers being in its own profile at the leaves. A profile may inherit another profile, including all of its attributes, in order to localize and create a new sub-profile. For instance, a root profile may contain all servers in Boulder. The next sub-profile in the hierarchy may comprise Disney's® servers, the next sub-profile may comprise Disney's® Linux® servers, and the next sub-profile may comprise Disney's® Linux® servers with Kernel 2.4.16 and above. It should be noted that profiles may also be constructed as the intersection or union of multiple parent profiles.

FIG. 5 is a flowchart of a process for creating a profile in accordance with the illustrative embodiments. The process depicted in FIG. 5 may be implemented in a data processing system, such as data processing system 300 in FIG. 3. The process begins with the administrator logging into the administrative server via a Web-based administrative interface (step 502). For instance, the administrator may log into administrative server 302 using administrative interface 322 in FIG. 3. The administrator may then select an option in the administrative interface to create a new profile (step 504). A determination is then made as to whether the administrator has selected the new profile to be a manual profile (e.g., JBOS profile) or a dynamic/automated profile (ABP profile) (step 506). If the administrator has selected to create an automated profile, the administrator may enter search criteria for the profile (step 508) which specify the criteria for grouping a set of servers together. For instance, a series of dialog boxes may be provided in administrative interface which allows the administrator to establish server attributes for inclusion in the profile, such as, for example, all servers running UNIX®. If the user enters search criteria for the profile, the administrator may then designate the profile to be fully automatic or semi-automatic (step 510). If the profile is fully automatic, the administrative server may transparently move servers in and out of a profile based on the servers' attributes without prompting the administrator for approval (step 512). If the profile is semi-automatic, the administrative server provides suggestions to the administrator to move eligible servers, and those servers are only moved in and out of profiles upon administrator approval (step 514).

Turning back to step 506, if the administrator has selected to create a manual profile, the administrator may enter an IP address or a list of IP addresses for the servers the administrator wants to group together in the profile (step 516).

Figure 6:
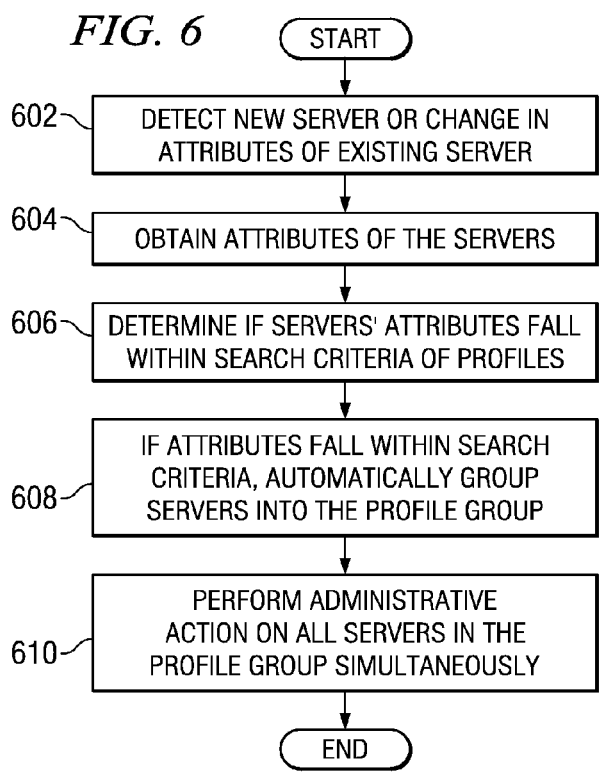
FIG. 6 is a flowchart of a process for automatically aggregating servers via profile-driven management in accordance with the illustrative embodiments.

FIG. 6 is a flowchart of a process for automatically aggregating servers via profile-driven management in accordance with the illustrative embodiments. The process depicted in FIG. 6 may be implemented in a data processing system, such as data processing system 300 in FIG. 3. The process begins with the administrative server detecting a new server or a change in attributes of an existing server (step 602). The administrative server obtains the attributes of the servers (step 604). The attributes may be obtained using a publish-subscribe model, performing a scan of the servers, or using existential attributes tagged by the administrator. The administrative server then determines if the servers' attributes fall within the search criteria of one or more profiles (step 606). If the servers' attributes fall within the search criteria of a profile, the administrative server automatically groups the servers into the profile group (step 608). If the servers were previously assigned to a profile but now no longer fall within that profile, the administrative server may also automatically remove the servers from that profile. The administrator may now perform an administrative action on all of the servers in the profile group simultaneously (step 610).

Figure 7:
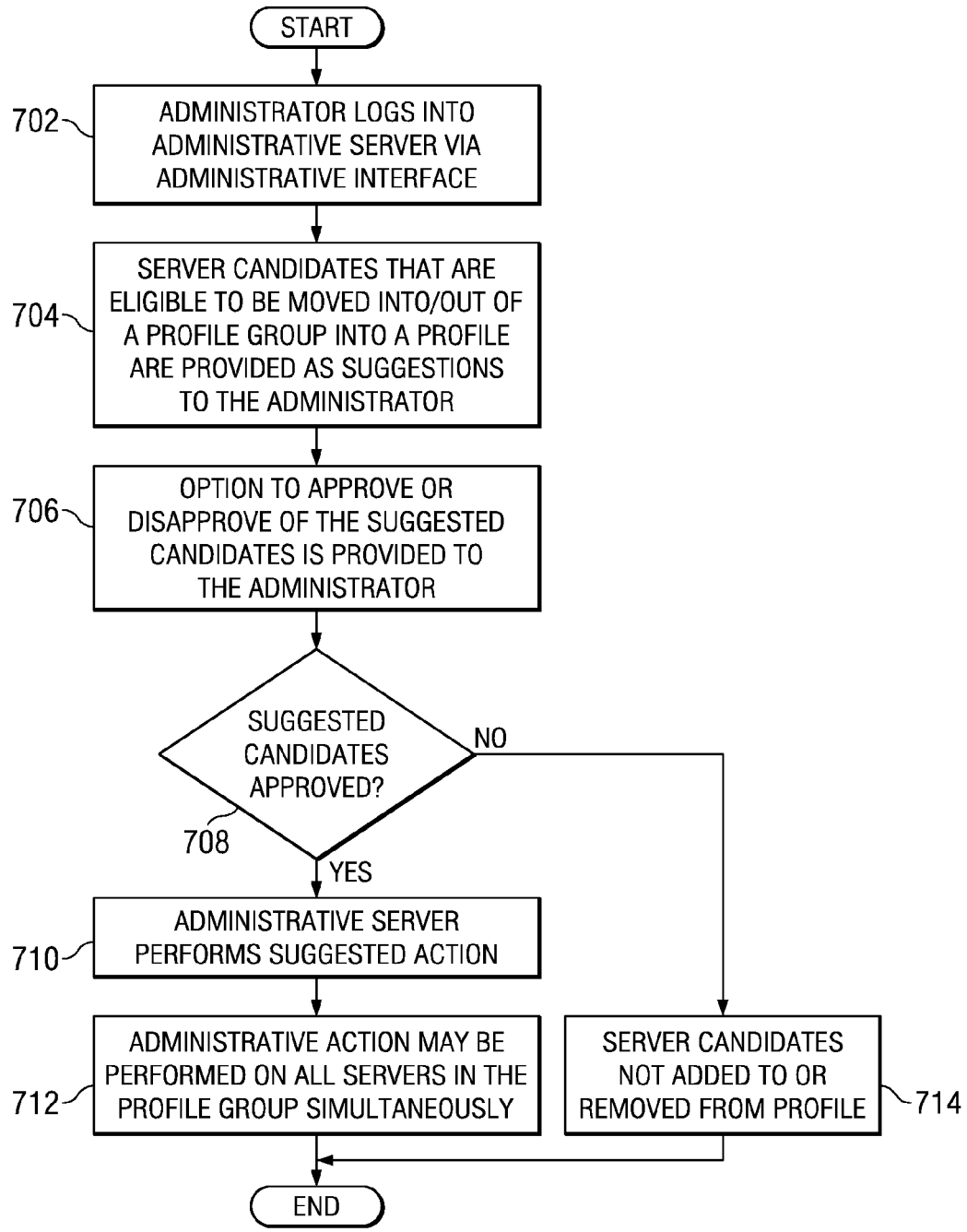
FIG. 7 is a flowchart of a process for semi-automatically aggregating servers via profile-driven management in accordance with the illustrative embodiments.

FIG. 7 is a flowchart of a process for semi-automatically aggregating servers via profile-driven management in accordance with the illustrative embodiments. The process depicted in FIG. 7 may be implemented in a data processing system, such as data processing system 300 in FIG. 3. The process begins with the administrator logging into the administrative server via a Web-based administrative interface (step 702). For instance, the administrator may log into administrative server 302 using administrative interface 322 in FIG. 3. Upon log in, the administrative interface provides server candidates that are eligible to be added to or removed from profiles to the administrator (step 704). The administrative interface provides the administrator with the option to approve or disapprove of the suggestions (step 706). A determination is then made as to whether the administrator approved the suggestion (step 708). If the administrator approves of a suggestion, the administrative server performs the suggested action (step 710). The administrator may now perform an administrative action on all of the servers in the updated profile group simultaneously (step 712). If the administrator disapproves of the suggestion, the administrative server takes no action and the server candidates are not added to or removed from the profile (step 714).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for managing a plurality of servers using profiles, the computer implemented method comprising:

performing an action on the plurality of servers, wherein performing the action comprises running a security scan on the plurality of servers;

responsive to performing the action on the plurality of servers, automatically creating a profile based on results of the actions performed on the plurality of servers, wherein the profile includes a set of search criteria comprising one or more server attributes, and wherein the profile is a dynamic profile, at least one of the set of search criteria for the dynamic profile comprising one or more user-definable server attribute variables, wherein automatically creating the profile comprises responsive to running a security scan on the plurality of servers, creating the profile based on results of the security of scan, wherein a first profile is created for servers in the plurality of servers that passed the security scan and a second profile is created for servers in the plurality of servers that failed the security scan;

obtaining a list of attributes of each server in the data processing system;

grouping servers in the plurality of servers whose attributes meet the set of search criteria specified in the profile to form a profile group, wherein the servers are grouped into a hierarchy of profiles, with all servers being members of a root profile, and each server being a member of its own profile at a leaf; and performing an administrative action on all of the servers in the profile group simultaneously, wherein the administrative action comprises a single action that creates configuration updates specific to each server in the profile group.

2. The computer implemented method of claim 1, wherein grouping the servers is performed automatically or semi-automatically.

3. The computer implemented method of claim 2, wherein if the grouping is performed automatically, transparently grouping the servers without prompting for user approval.

4. The computer implemented method of claim 2, wherein if the grouping is performed semi-automatically, providing suggestions of servers eligible to be grouped to a user, and grouping the eligible servers only upon receiving user approval.

5. The computer implemented method of claim 1, wherein the profile is created by a user via an administrative interface.

6. The computer implemented method of claim 1, wherein obtaining the list of attributes of each server is performed by at least one of a server advertising its attributes, scanning the server to determine its attributes, or tagging the server with existential attributes.

7. The computer implemented method of claim 1, wherein reports are generated based on profile membership.

8. The computer implemented method of claim 1, further comprising:
associating policies to the profile.

9. The computer implemented method of claim 1, further comprising:
associating policy variables to the profile.

10. The computer implemented method of claim 1, further comprising:
associating constraints to the profile.

11. The computer implemented method of claim 1, wherein servers are moved among profile groups as the servers' attributes change.

12. The computer implemented method of claim 1, wherein a server is a member of zero, one, or more profile groups.

13. The computer implemented method of claim 1, wherein the profile is a local profile created and maintained by a single administrator.

14. The computer implemented method of claim 1, wherein the profile is a global profile created and maintained by a plurality of administrators.

15. The computer implemented method of claim 1, wherein the one or more server attributes comprise static attributes defining roles and behaviors of servers in the profile group and dynamic attributes validated at the servers.

16. The computer implemented method of claim 1, wherein detection of a change to an attribute of a server in the profile group that results in the attribute no longer meeting the set of search criteria specified in the profile causes an administrative server to automatically remove the first server from the profile group; and
wherein detection of a change to an attribute of another server not in the profile group that results in the attribute meeting the set of search criteria specified in the profile causes the administrative server to automatically add the second server to the profile group.

17. A data processing system for managing a plurality of servers using profiles, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to perform an action on the plurality of servers, wherein in executing the computer usable code to perform the action the processor unit executes the computer usable code to run a security scan on the plurality of servers; automatically create a profile based on results of the actions performed on the plurality of servers in response to performing the action on the plurality of servers, wherein the profile includes a set of search criteria comprising one or more server attributes, wherein the profile is a dynamic profile, wherein at least one of the set of search criteria for the dynamic profile comprises one or more user-definable server attribute variables, and wherein in executing the computer usable code to automatically create the profile the processor unit executes the computer usable code to create, responsive to running a security scan on the plurality of servers, the profile based on results of the security of scan, wherein a first profile is created for servers in the plurality of servers that passed the security scan and a second profile is created for servers in the plurality of servers that failed the security scan; obtain a list of attributes of each server in the data processing system; group servers in the plurality of servers whose attributes meet the set of search criteria specified in the profile to form a profile group, wherein the servers are grouped into a hierarchy of profiles, with all servers being members of a root profile, and each server being a member of its own profile at a leaf; and perform an administrative action on all of the servers in the profile group simultaneously, wherein the administrative action comprises a single action that creates configuration updates specific to each server in the profile group.

18. A computer program product for managing a plurality of servers using profiles, the computer program product comprising: a computer readable storage device having computer usable program code stored thereon, the computer usable program code comprising: computer usable program code for performing an action on the plurality of servers wherein the computer usable program code for performing the action comprises computer usable program code for running a security scan on the plurality of servers; computer usable program code for, responsive to performing the action on the plurality of servers, automatically creating a profile based on results of the actions performed on the plurality of servers, wherein the profile includes a set of search criteria comprising one or more server attributes, and wherein the profile is a dynamic profile, wherein at least one of the set of search criteria for the dynamic profile comprises one or more user-definable server attribute variables, and wherein the computer usable program code for automatically creating the profile comprises computer usable program code for, responsive to running a security scan on the plurality of servers, creating the profile based on results of the security of scan, wherein a first profile is created for servers in the plurality of servers that passed the security scan and a second profile is created for servers in the plurality of servers that failed the security scan; computer usable program code for obtaining a list of attributes of each server in the data processing system; computer usable program code for grouping servers in the plurality of servers whose attributes meet the set of search criteria specified in the profile to form a profile group, wherein the servers are grouped into a hierarchy of profiles, with all servers being members of a root profile, and each server being a member of its own profile at a leaf; and computer usable program code for performing an administrative action on all of the servers in the profile group simultaneously, wherein the administrative action comprises a single action that creates configuration updates specific to each server in the profile group.

* * * * *